United States Patent [19]

Bean et al.

[11] 4,280,553
[45] Jul. 28, 1981

[54] SYSTEM AND PROCESS FOR STORING ENERGY

[75] Inventors: Samuel L. Bean, Jamesville; James W. Swaine, Jr., Manlius; Paul R. Crawford, Freeville, all of N.Y.

[73] Assignee: Allied Chemical Corporation, Morris Township Morris County, N.J.

[21] Appl. No.: 21,282

[22] Filed: Mar. 16, 1979

[51] Int. Cl.³ .............................................. F28D 21/00
[52] U.S. Cl. ................... 165/1; 165/104.17; 126/435; 252/70
[58] Field of Search ............... 165/104 S; 126/400, 126/435; 252/70

[56] References Cited

U.S. PATENT DOCUMENTS

| | | | |
|---|---|---|---|
| 3,952,519 | 4/1976 | Watson | 252/70 X |
| 4,091,863 | 5/1978 | Schroder | 165/104 S X |
| 4,154,292 | 5/1979 | Herrick | 165/104 S X |

FOREIGN PATENT DOCUMENTS

| | | | |
|---|---|---|---|
| 50-90584 | 7/1975 | Japan | 252/70 |
| 52-11181 | 1/1977 | Japan | 252/70 |

Primary Examiner—Albert W. Davis
Attorney, Agent, or Firm—Thomas D. Hoffman; Anthony J. Stewart

[57] ABSTRACT

There is disclosed a process for storing energy by use of the heat of fusion of hydrated salts which are within a bulk container having heat exchange means. The process prevents stratification and supercooling from occurring during the heat releasing cycles by internally circulating the molten salt within the container and also by preventing the temperature of the salt from rising above that at which complete melting of the salt crystals within the container occurs.

7 Claims, 3 Drawing Figures

SYSTEM AND PROCESS FOR STORING ENERGY

BACKGROUND OF THE INVENTION

This invention relates to a system for storing and releasing energy as heat and to a process for operating such a system.

It has been known for some time that hydrated salts having a heat of fusion of above about 116 kJ/kg (50 BTUs per pound) can be used as heat storage media. Heat is absorbed in these hydrated salts causing a phase change from solid to liquid. Thereafter, the heat is recovered by allowing the molten salt to solidify and release the heat which was absorbed.

Certain serious problems have heretofore been encountered in the operation of these hydrated salt heat storing systems. The phenomenon known as supercooling prevents the release of useful heat from these systems. This occurs when a molten salt cools below its freezing point without the formation of solid material. Thus, instead of employing the heat of fusion of the hydrated salt, only the sensible heat, which is many times less than the heat of fusion, is recovered. The prior art has attempted to avoid the problem of supercooling by introducing nucleating agents which provide an initial seed for the formation of salt crystals.

An additional problem associated with the use of hydrated salts as bulk heat storage media is the known tendency of these materials to also form other salts of lower hydration with a corresponding loss in the heat of fusion. Since the density of these crystals is greater than the density of the solution the crystals settle to the bottom of the container. During subsequent heat absorption-heat releasing (melting-solidification) cycles the system becomes stratified vertically into layers with both decreasing density and composition. Eventually the amount of lower hydrated salt, or even anhydrous salt, grows progressively larger with a corresponding increase in an upper weak liquor layer and a significant deterioration in the energy storage capability of the system. Prior art attempts to overcome this stratification problem have involved the use of thickeners to prevent the formation of layers by so dispersing the salt media and excess water in such a way that the appropriate number of water molecules are available in the immediate vicinity of the anhydrous or lower hydrated salt in order to recombine in the next heating cycle.

It has also been suggested by the prior art that both problems, i.e., supercooling and stratification, could be avoided by mixing or stirring of the molten hydrated salt. However, such a solution was discarded due to the inconvenience or impossibility of affecting agitation in heat storage systems. Indeed, much of the focus of the prior art workers in this field have been on the use of a large number of relatively small sealed containers of hydrated salts having at least one dimension thin enough to assist in preventing stratification. Generally, the prior art teaches away from the use of bulk containers of hydrated salts as heat storage media and those prior art systems which do contain the salt in bulk are awkward to operate and also require nucleating agents to prevent supercooling.

Ideally, heat storage systems for large buildings or homes, e.g., in conjunction with solar heat receiving means, would involve storage of the hydrated salts in bulk. Such a system has the obvious advantage of lower cost, maintenance and the like.

It is accordingly an object of this invention to provide a process for storing and releasing heat employing the heat of fusion of hydrated salts contained within bulk containers.

It is another object of this invention to provide a heat storage-releasing process employing such salts stored in bulk and which avoids the problems of supercooling and stratification.

It is an additional object of this invention to provide a system for storing and releasing heat in a hydrated salt stored in bulk.

These and other objects will become apparent from the description which follows.

BRIEF SUMMARY OF THE INVENTION

In accordance with this invention there is provided an improved process for storing and releasing heat wherein heat is absorbed by a solid hydrated salt, preferably an inorganic salt, stored in a bulk container thereby causing said salt to become molten, and thereafter said molten salt is allowed to solidify, and the heat released from said salt in the solidification step is recovered. The improvement comprises terminating the input of heat into said salt prior to the complete conversion of said solid salt to the molten state and internally circulating said salt within said container during the solidification step.

There is also provided a system for storing heat through the heat of fusion of a hydrated salt, which system comprises a closed container for said salt, heat exchange means within said container adapted to supply heat to and remove heat from the contents of the container, means to terminate the supply of heat to the contents of the container in response to the temperature of said contents, and means within said container to circulate the contents thereof.

It has been found that by operating in accordance with the process of this invention supercooling and stratification of the hydrated salt are avoided and the heat storage efficiency of the salt stored in bulk is not significantly decreased over a large number of heat absorbing-heat releasing cycles. By terminating the input of heat into the hydrated salt prior to the conversion of all of the solid particles to the molten state, the solid particles remaining act as nucleating agents during the cooling and supercooling is thereby avoided.

DETAILED DESCRIPTION OF THE INVENTION

Hydrated salts useful as heat storage media are those which exhibit a heat of fusion of more than 116 kJ/kg (50 BTUs per pound). Among the salts which can be mentioned as falling within this category, and which are useful in the process and system of the present invention, are:
$Na_2SO_4.10H_2O$
$Na_2S_2O_3.5H_2O$
$NaH_2PO_4.7H_2O$
$Na_2HPO_4.12H_2O$ $Na_3PO_4.12H_2O$
$Na_2CO_3.10H_2O$
$CH_3COONa.3H_2O$
$CaCl_2.6H_2O$
$MgCl_2.6H_2O$
$Ca(NO_3)_2.4H_2O$
$KF.2H_2O$
$K_2Mg(SO_4)_2.6H_2O$,
and other like salts. A common characteristic among these salts is their tendency under certain conditions to form another hydrate other than the one which exhibits a high heat of fusion. For example, sodium thiosulfate pentahydrate melts in its own water of crystallization and will, upon cooling and solidification in certain cases, tend to form sodium thiosulfate dihydrate which is useless as a heat storage material. A similar result occurs in other salt hydrate systems upon formation of undesired lower hydrates or anhydrous salts.

Figure 1:
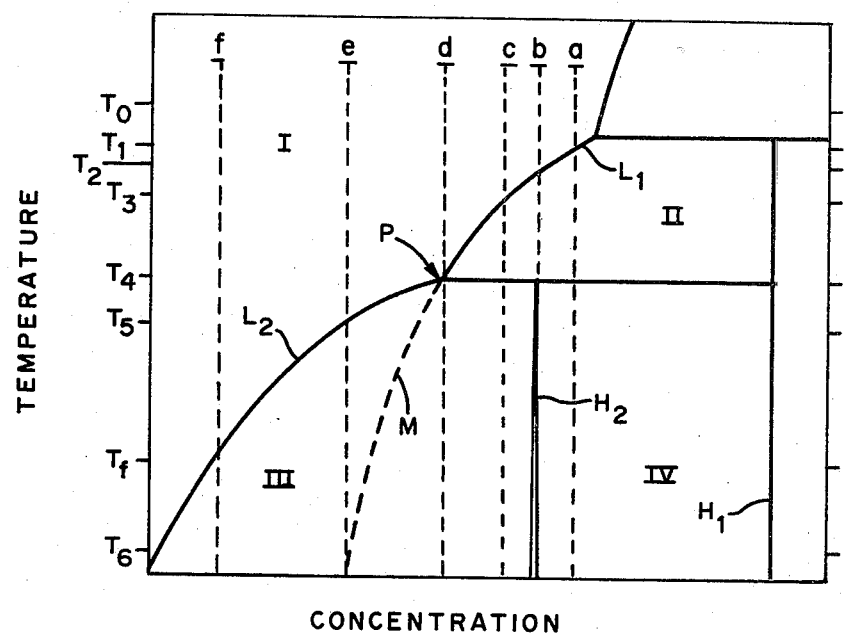
FIG. 1 is a portion of a generalized equilibrium phase diagram for an incongruently melting hydrated salt system.

This characteristic will be more fully understood with reference to FIG. 1 wherein dotted lines identified as a, b, c, d, e and f represent different concentrations of the salt in water. Points $T_0$, $T_1$, $T_2$, $T_3$, $T_4$, $T_5$, $T_6$ and $T_f$ represent specific temperatures, $H_1$ and $H_2$ represent different solid hydrates of the same salt, $H_2$ being the desired hydrate; P represents the peritectic composition; $L_1$ and $L_2$ represent liquidus lines; M represents a metastable extension of $L_1$, and I, II, III and IV represent areas of different physical states of the salt.

Area I represents the combinations of temperature and liquor composition that are homogeneous and liquid. The boundary between Area I and Area II represents the temperature at which, for each liquor composition, the first crystals of composition $H_1$ appear on cooling and the last crystals of $H_1$ disappear on heating.

If a liquid mixture having the composition a is cooled slowly from $T_o$, the first crystals of $H_1$ appear at $T_1$. Upon continued cooling more solid $H_1$ appears while the liquor concentration decreases along line $L_1$ toward the peritectic composition P. When the temperature $T_4$ is reached the remaining liquid of composition d reacts with solid $H_1$ to form a new solid phase of composition $H_2$. As long as solid $H_1$ and $H_2$ both remain in equilibrium with the residual liquid the temperature must remain constant at $T_4$. Once all of the liquid has been consumed in forming crystal, the temperature of the solids remaining will continue to decrease to the final cooling temperature $T_f$ with no additional transformation of $H_1$ and $H_2$.

If a pure solid of composition $H_2$ (or b) obtained in a crystallization process is melted by heating from $T_f$ to $T_o$, it has been found that on cooling it is not pure $H_2$ that is first formed, but a mixture of $H_1$ and $H_2$. When cooling the homogeneous melt of composition b from $T_o$ the first crystals of $H_1$ appear at $T_2$ while the liquid composition decreases along the boundary $L_1$ toward the peritectic composition P. When the temperature $T_4$ is reached, the remaining liquid of composition d reacts with solid $H_1$ to form a new solid phase $H_2$. As long as solid $H_1$ and $H_2$ both remain in equilibrium with residual liquid the temperature must remain constant at $T_4$. For this particular composition b, the only way that all the liquid can be consumed is to convert all the $H_1$ eventually into solid $H_2$.

Cooling a homogeneous solution of c from $T_o$ is similar to b until $T_4$ is reached and there is now sufficient liquid remaining to convert all the $H_1$ solid into $H_2$ and to leave a small residual liquid of composition d. Upon further cooling to the temperature $T_f$ additional $H_2$ crystallizes and the liquid composition follows the line $L_2$ between Area I and Area III to composition f.

Cooling a homogeneous solution of composition d from $T_o$ down to $T_4$ produces either solid $H_1$ or solid $H_2$ (or both $H_1$ and $H_2$) at equilibrium and on further cooling any $H_1$ formed should be converted to $H_2$ and the remaining liquor composition follows the line $L_2$ to $T_f$ (or composition f).

If however, on cooling down below $T_4$ no crystals of $H_2$ form spontaneously (or are added intentionally as crystal seed) supercooling occurs and there is produced relatively large quantities of $H_1$ below the metastable dotted line extension M of liquids curve $L_1$ thru P.

Cooling a homogeneous solution of composition e from $T_o$ down to $T_5$ produces no $H_1$ solid. (In fact in order to produce $H_1$ solid supercooling would have to occur to a temperature less than $T_6$ where the composition e intersects with the line M at $T_6$). Nucleation of $H_2$ should occur at $T_5$ and with continuing $H_2$ crystal growth the remaining liquor composition follows the line $L_2$ to composition f at the final temperature $T_f$.

Figure 2:
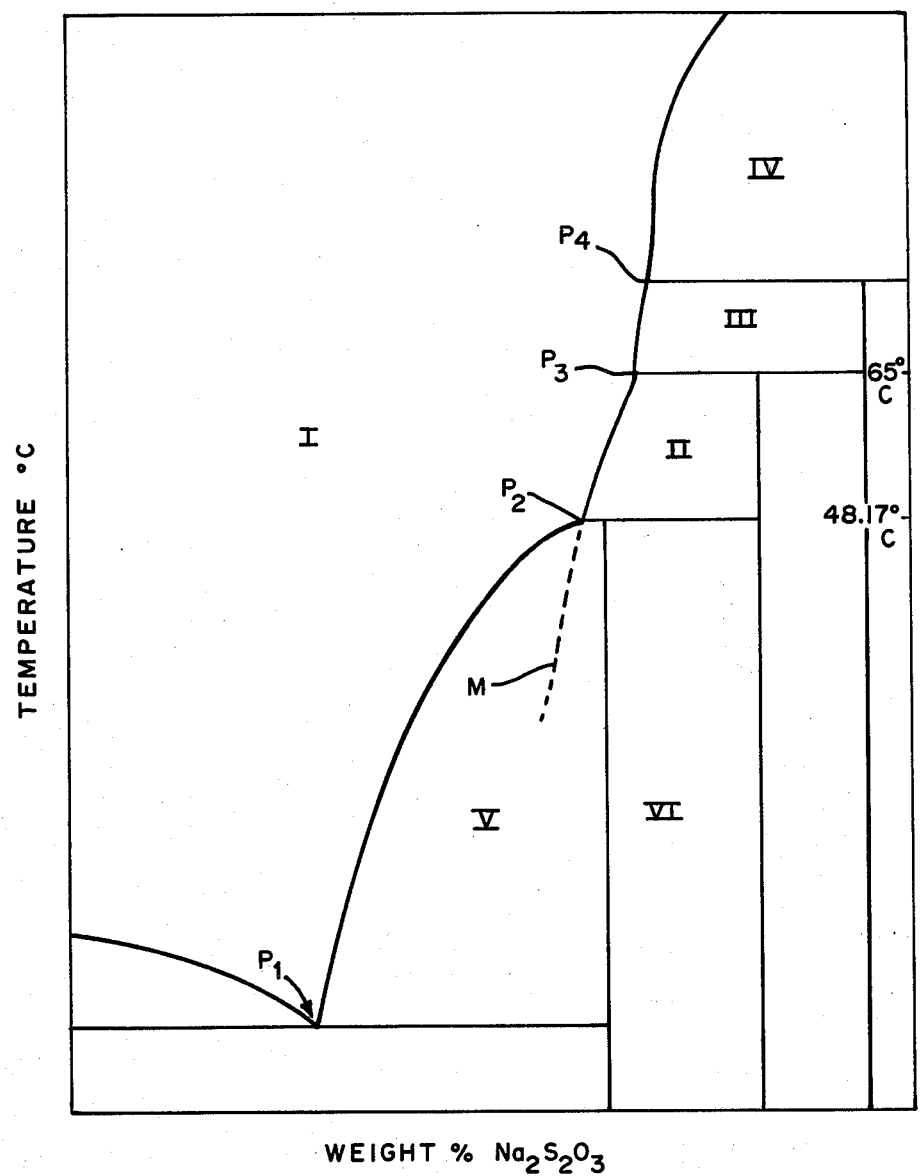
FIG. 2 is an equilibrium phase diagram for the system sodium thiosulfate-water.

Referring to FIG. 2, an equilibrium phase diagram for the sodium thiosulfate water system, Area I represents the temperature-concentration region of the phase diagram where all solutions of sodium thiosulfate are homogeneous and liquid. Area IV represents liquid in equilibrium with anhydrous salt, Area III liquid in equilibrium with hemihydrate, Area II liquid in equilibrium with dihydrate, Area V liquid in equilibrium with pentahydrate, and Area VI represents solid dihydrate in equilibrium with solid pentahydrate. $P_1$ represents a eutetic point; and $P_2$, $P_3$ and $P_4$ represent peritectic points. The liquidus line connecting the eutectic point $P_1$ with point $P_2$ defines the temperature at which for each liquor composition in the range of 30% $Na_2S_2O_3$ to 61.6% $Na_2S_2O_3$ the first crystal of pentahydrate appears on cooling and the last crystal of pentahydrate disappears on heating. The liquidus line between $P_2$ and $P_3$ defines the temperature at which for each liquor composition in the range of 61.6% $Na_2S_2O_3$ to 68.0% $Na_2S_2O_3$ the first crystals of dihydrate appear on cooling and the last crystals of dihydrate disappear on heating.

Similar points to those presented for FIG. 1 could be used to describe the heating and cooling of sodium thiosulfate solutions of various concentrations as they pertain to the equilibrium phase diagram especially in the concentration range 50% to 68% $Na_2S_2O_3$. While the concentration is important as illustrated in the phase diagram, it is not a determinative factor in the formation of either the desired pentahydrate crystal or the nondesirable dihydrate crystal. In fact the equilibrium phase diagram can be used to explain observations of real nonequilibrium bulk systems. In repeated cycles of heat absorption and heat release of any solution in this concentration range (50-68% $Na_2S_2O_3$) crystals of dihydrate or pentahydrate, if they form, being more dense than the solution, will settle through the bulk solution to the bottom of the container. Since the melting point of the dihydrate is higher than the anticipated upper temperature limit of flat plate solar collectors for example, dihydrate crystals will not melt on the next heating cycle and therefore cannot recombine with any excess water. Pentahydrate crystal will melt on the next heating cycle producing a liquid layer which on the next cooling cycle will produce more dihydrate which settles out on the bottom of the container. This is one mechanism which will explain the observation that heretofore bulk systems eventually produce dihydrate crystal, weak liquor, and some actually stored less thermal energy than an equivalent volume of water. A second mechanism for system failure involves supercooling of thiosulfate solutions to temperatures below the dotted line extension M of the dihydrate liquidus curve $P_3$-$P_2$. At temperatures below this curve existing crystals of dihydrate continue to grow and new crystals of dihydrate may form depleting the solution of thiosulfate without the ability to form more energy storing pentahydrate crystal. The water rejected in this process becomes the weak thiosulfate liquor layer. Each successive cycle which does not produce pentahydrate crystal adds to the progressive failure of bulk energy storage.

Figure 3:
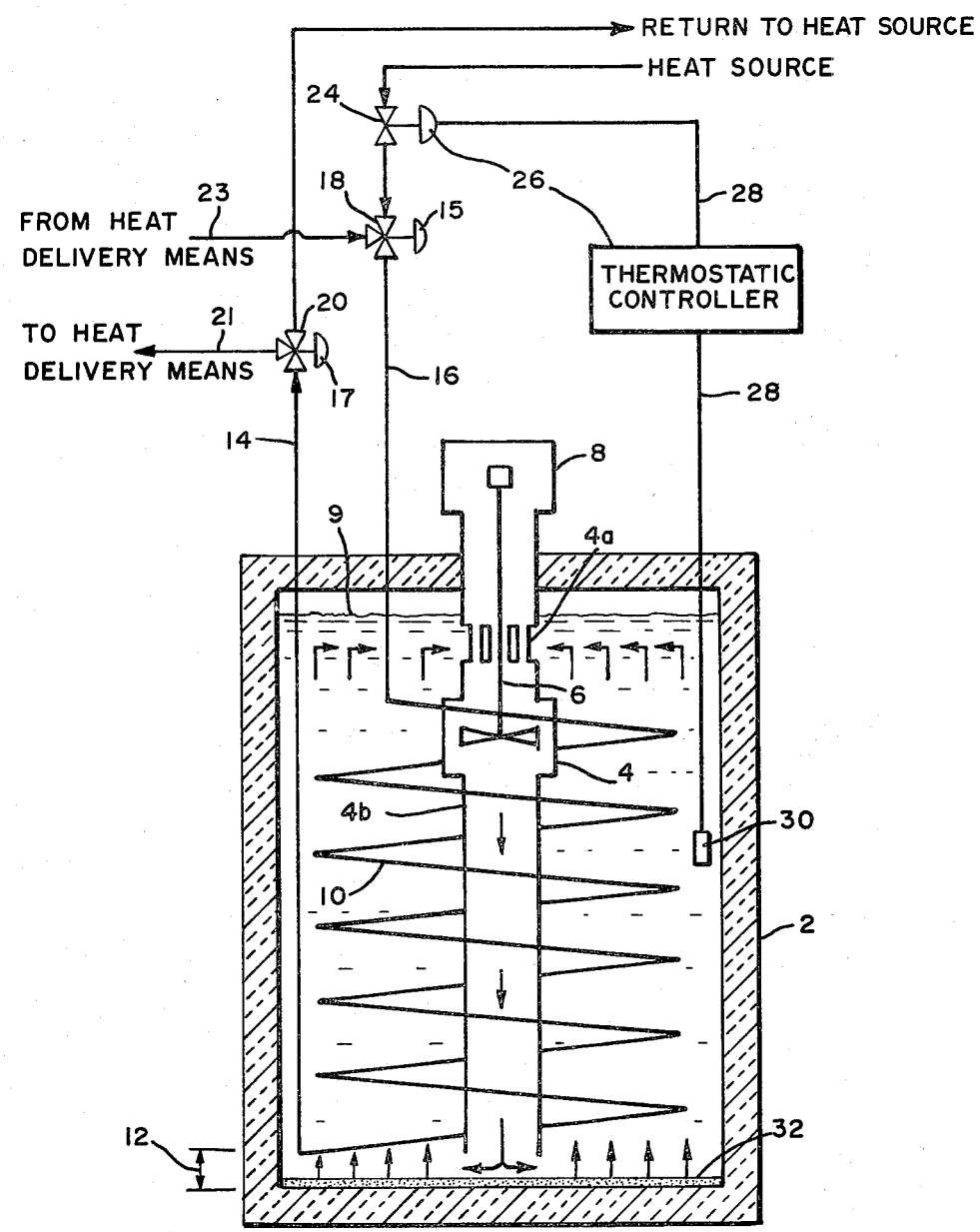
FIG. 3 is a systematic representation of an embodiment of the process and system of the present invention.

The invention is better understood by reference to FIG. 3, exemplary of an embodiment of the process and system of the present invention for storing and releasing heat. A closed, insulated cylindrical storage vessel 2 containing heat storage medium in the form of an aqueous solution of sodium thiosulfate ($Na_2S_2O_3$), a pump 4 and heat exchange means 10 is presented. The pump 4 comprises a stirrer 6 driven by motor 8 which are enclosed conveniently in a hollow cylindrical tube open at the bottom, and is provided with openings 4a positioned just below solution level 9 to allow for circulation of the heat storage medium from top of vessel 2 downward through downcomer 4b of pump 4 to bottom of said vessel 2. The action of stirrer 6 within pump 4 distributes the solution radially across the bottom and up through the annular space between heat exchange means 10 and walls of vessel 2. Heat exchange means 10, comprising a hollow tube or tubes, is positioned within vessel 2 so that a gap 12, usually a 2 to 3 centimeter gap, is provided between the bottom of vessel 2 and heat exchange means 10. Conveniently, the same heat exchange means 10 is used to provide heat as well as to withdraw heat. Accordingly, exchange means 10 is connected to heat source (not shown) by a inlet connection means 16 containing values 18 and 24, and by outlet connection means 14 containing valve 20. Valves 18 and 20 are provided with heat controller means 15 and 17, respectively, for connection to a heat delivery means (not shown) via line 21, and return therefrom via line 23. Water, or other liquid, is pumped (not shown) from heat source through the connecting means 16 to heat exchange means 10 thereby transferring heat from heat source to the hydrated salt. The input of heat into the hydrated salt ($Na_2S_2O_3.5H_2O$) in contact with a solution of sodium thiosulfate is terminated at about 50° C. as measured by a temperature sensing device such as thermocouple 30 connected to valve 24 via wire 28 and thermostatic controller 26, thereby preserving a thin crust 32 of solid sodium thiosulfate pentahydrate ($Na_2S_2O_3.5H_2O$) which covers the bottom surface of storage vessel 2. When heat is needed for delivery means, a liquid, such as water, is pumped from a storage means (not shown) through the heat delivery means (not shown) and back to storage means whereby heat is withdrawn from the aqueous sodium thiosulfate solution and transferred to heat delivery means via the circulating liquid. Circulation of the slightly cooler liquid from heat delivery means within heat exchange means 10 produces a slightly cooler solution of sodium thiosulfate which is circulated via pump 4 downward across the surface of the crust 32 at the bottom of vessel 2 and nucleation of the system occurs promptly.

The preferred hydrated salt for use in the process of this invention is sodium thiosulfate ($Na_2S_2O_3$), a commercially produced chemical. Its pentahydrate crystal is known to have good heat storage properties. The amount of heat required to melt this crystal is $3\frac{1}{2}$ times as much as the amount required to heat an equal volume of water 20° C. This heat can be recovered at the freezing point temperature which is about 48° C. Thus such a heat storage system could be made to absorb and release large quantities of heat over a very small temperature range. Another preferred salt is sodium acetate trihydrate. The freezing point of this salt is about 58° C. and thus, when the heat input is from a source generating heat at a higher temperature than, e.g., a flat plate collector, heat storage capacity at a higher temperature is realized.

It has been discovered that supercooling, and resultant stratification, can be avoided in bulk, hydrated salt heat storage systems by the process of the present invention. By providing for internal circulation of the heat storage medium during solidification the liquid layers which would otherwise settle are prevented from doing so and the system becomes conducive to the formation of the desired hydrate, e.g., sodium thiosulfate pentahydrate. Circulation, or mixing, of the salt medium will not, by itself, insure the avoidance of supercooling. It is believed that some solid crystals of the desired hydrate should be present in the system during the heat-release operation in order to insure solidification as the desired hydrate. According to the present invention, this is accomplished by terminating the input of heat into the system prior to the point at which all of the solid desired hydrate, e.g., sodium thiosulfate pentahydrate, is melted. Since the salt storage medium is in bulk, even though the temperature indicators signify that the melting point of the salt is reached, or even that the temperature is slightly higher than the melting point, somewhere within the bulk system solid particles will remain. For example, encrustation at the bottom or elsewhere in the tank. By insuring the presence of some solid hydrate, when the system is circulated there is the required degree of nucleation and thus, supercooling is avoided.

The heat storage system of the present invention employs a bulk container which is closed during operation to protect the contents and to reduce loss of liquid through evaporation. Within the container are provided means for providing heat to the salt as well as means for withdrawing heat as the salt is allowed to solidify. Conveniently, such means comprise a hollow tube or tubes located on the inside of the container. Preferably the same heat exchange tube is used to provide heat as well as to withdraw heat. Accordingly, the external connection to the tube has valve means to allow for connection with, e.g., a collector of solar heat, and water, or other liquid, is pumped from collector through the inside of the heat storage means whereby heat is transferred to the hydrated salt. The valve would also provide for connection to a heat delivery means, e.g., a baseboard heating system, and when heat is needed a liquid, such as water, would be pumped from the storage means through the heat delivery means and back to the storage means whereby heat is withdrawn from the salt as it is allowed to solidify and transferred to the circulating liquid. The system is supplied with means, i.e., a pump, to internally circulate the salt stored in the container during the solidification thereof. This circulation, as described above, will prevent supercooling and stratification and accordingly formation of disadvantageous amounts of undesired hydrate, by bringing the liquid phase into contact with crystals of the desired hydrate which in turn act as nucleating means. The presence of crystals is assured by providing the container with temperature sensitive means which will terminate the input of heat into the container at a point prior to the complete conversion of the salt from solid to liquid. Conveniently, such temperature sensitive means will automatically stop the input of heat of the salt when a predetermined temperature is reached within the container.

In operation, it has been found desirable to provide a space, preferably near the bottom of the container, where no heat input means are placed. For example, in a 75 cm (30 inches) high, 114 liter (30 gallon) container, the bottom 2 to 5 cm would be devoid of heat exchange means. Since it is impracticable to expect that the entire 114 liters of hydrated salt will reach the melting point at the same time, such a temperature, or preferably even a slightly higher temperature, is conveniently used for the cut off. That is, when the temperature sensing device senses the melting point, the input of heat is terminated. Some solid crystals have been found to remain within the container in that area where the heat exchange tubes have been eliminated. When it is desired to withdraw heat from the salt, the liquid is circulated, preferably from top to bottom, thus providing contact of the solution with the crystals which have remained and which in turn act as a nucleating agent for formation of the desired solid hydrated salt.

It has been found preferable to employ a hydrated salt having a concentration slightly less than the composition of the desired hydrate. Solidification from a solution having the exact composition of the desired hydrate will result in the formation of undesired hydrate which is, of course, of no benefit to the heat storage operation. For example, a sodium thiosulfate solution having a concentration of 63.7% which corresponds to $Na_2S_2O_3 \cdot 5H_2O$, will, upon cooling, produce some dihydrate before the pentahydrate crystallizes. With this system, it is preferred to employ a solution having a concentration below 61.6%, generally 55 to 61%.

Additionally, it is also necessary to add seed crystals of the desired hydrate for the first cooling cycle. Since the bulk container will ordinarily be filled with liquid salt solution the probability of crystals being present is remote. However, once operation in accordance with this invention is commenced, the upper temperature cutoff will, as described above, insure the presence of crystals of the desired hydrate.

DESCRIPTION OF PREFERRED EMBODIMENTS

Example 1

A 114 liter (30 gallon) tank with a coil inside for heating and cooling is filled with hot sodium thiosulfate solution. The composition of the material, as hot solution is 63.7% $Na_2S_2O_3$ by weight which is equivalent to that of pentahydrate crystal. This unit is cycled by heating it to a temperature above the melting point of 48° C. and cooling it well below the freezing point of 48° C. For comparative purposes, only the heat removed between 50° C. and 30° C. in a cooling cycle is said to be the heat storage capacity.

As the unit is cycled repeatedly, there is a gradual but progressive loss in heat storage capacity from about 27 400 kJ (26,000 BTU) originally to about 12 700 kJ (12,000 BTU) in less than 20 cycles. The unit is opened up and a considerable amount of dilute solution is found at the top of the unit even at 30° C. or lower. Also there is a mass of crystal on the bottom of the unit which will not melt even at 60° C. The contents, while cycling in this fashion, tend to separate into a solid phase on the bottom which will not melt and a liquid phase on the top which will not freeze. Chemical analyses of these layers show that the solid is sodium thiosulfate dihydrate and the liquid is dilute thiosulfate solution.

Example 2

A similar unit with a modified heating and cooling coil is fitted with hot 63.7% sodium thiosulfate solution. The coil is designed to cool the top part of the unit faster and freeze the solution from the top down to the bottom. After 30 cycles the heat storage capacity has descreased to less than half of the original 27 400 kJ. The tank is opened up and the material is found to have separated into dihydrate crystal on the bottom and dilute solution on top.

Example 3

Another 114 liter unit is filled with 63.7% sodium thiosulfate solution at 80° C. The unit is cooled as in the previous examples and the temperature drops to about 25° C. without any crystal formation or heat evolution. The heat recovered from the unit amounts to only the sensible heat from cooling the hot solution and no heat of crystallization.

The heat storage capacity of a supercooled unit is essentially the same as one filled with water. This unit would continue to supercool each cooling cycle until accidentally or deliberately seeded with pentahydrate crystal.

Example 4

The unit described in Example 3 is heated to about 50° C. Upon cooling, some pentahydrate seed crystal is added at about 45° C. and the crystals begin to grow. The temperature rises to the freezing point of 48° C. and holds steady until the heat of crystallization has been removed from the unit.

Example 5

A 114 liter unit is filled with hot sodium thiosulfate solution at a composition of 60%, or slightly less than that of the pentahydrate (63.7%). The unit is cooled and the heat storage capacity is measured to be about 27 400 kJ. As the unit is cycled, there is a gradual but progressive loss of heat storage capacity. After about 15 cycles, the capacity has descreased to less than half of the original 27 400 kJ. As in Examples 1 and 2, the unit is opened up and it is found that the sodium thiosulfate has separated into dilute solution on top and dihydrate crystal on the bottom.

Example 6

A similar unit is filled with 63.7% sodium thiosulfate solution at about 80° C. Means are provided to circulate the salt solution from the top of the unit to the bottom. As the unit is cooled, crystals begin to form at a few degrees above 48° C., the pentahydrate freezing point. There is virtually no heat of crystallization released, compared to the formation of pentahydrate, as the unit cools to 25° C. The crystals are identified to be sodium thiosulfate dihydrate.

Example 7

In this example the unit is filled with 60% sodium thiosulfate solution at about 80° C. As in Example 6, means are provided for circulating the solution. As the unit is cooled, the temperature drops below the freezing point of the desired pentahydrate (of 48° C.) to about 40° C. At this point crystals start forming, as in Example 6, without the heat release expected from the pentahydrate. The crystals are identified to be sodium thiosulfate dihydrate.

Example 8

A 114 liter unit is filled with hot sodium thiosulfate solution at a composition of 60%. As in Example 6, a means are provided for circulating the solution. In addition, a thermostatic device is provided to terminate the input of heat into the unit at a certain temperature to prevent overheating. The high temperature limit is set at about 50° C. Upon cooling the unit to about 45° C., in the first cooling cycle, sodium thiosulfate pentahydrate seed crystals are added to be sure that the desired crystal forms.

The heat storage capacity is measured to be about 27 400 kJ in the first cycle. After cycling more than 1500 times, the heat storage capacity has not decreased from its original value which corresponds to about 200 kJ/kg of material in the unit.

Example 9

The same unit from Example 8 is cycled without circulation of the sodium thiosulfate solution. After about 20 cycles, the heat storage capacity has descreased to less than half of the 27 400 kJ it stored each cycle in Example 8. The unit is opened up and it is found that the sodium thiosulfate has separated into dilute solution on top and dihydrate crystal on the bottom.

Example 10

A 3.8 liter (1 gallon) transparent plastic tank provided with a heat exchange coil, agitation and a thermostatic device, is used to simulate the unit from Example 8 on a smaller scale. Several different aqueous salt solutions with different properties are studied. All of the systems stored and released their heat consistently cycle after cycle. The following table is a list of these systems and their various properties.

TABLE I

| Salt Hydrate | Composition (Weight % Anhydrous Material) | Melting/ Freezing Point (°C.) | Heat Storage Capacity (kJ/kg) |
|---|---|---|---|
| $Na_2S_2O_3 \cdot 5 H_3O$ | 63.7 | 48 | 200 |
| | 60.0 | 47 | 200 |
| $Na_2SO_4 \cdot 10 H_2O$ | 44.0 | 32 | 151 |
| | 32.0 | 31 | 123 |
| $Na_2CO_3 \cdot 10 H_2O$ | 30.0 | 32 | 191 |
| $Na_2HPO_4 \cdot 12 H_2O$ | 35.0 | 35 | 181 |
| $CaCl_2 \cdot 6 H_2O$ | 50.5 | 29.5 | 209 |
| $CH_3COONa \cdot 3 H_2O$ | 58.0 | 58 | 349 |
| $Na_2SO_4 \cdot 10 H_2O$—KCl—NaCl | 36.0* | 16 | — |
| $Na_2SO_4 \cdot 10 H_2O$—KCl | 35.0** | 4 | — |
| $Na_2SO_4 \cdot 10 H_2O$—$NH_4Cl$ | — | 12 | — |

*16.6% KCl and 1.3% NaCl
**18.7% KCl

Example 11

A unit as described in Example 10 is filled with hot 60% sodium thiosulfate solution and seeded with pentahydrate on the first cooling cycle. The high temperature limit is set at 48.5° C. and the unit is cycled once an hour for a 24 hour period. Then the high temperature limit is raised ½ of a degree and the unit is cycled for another day. This is repeated until the high temperature limit is too high and the unit supercools as in Example 7 every cycle. In this case, the maximum high temperature limit for a 60% sodium thiosulfate system is about 49.5° C. It is noticed that all of the crystal from the previous cycle is readily dissolved upon heating above 49.5° C.

We claim:

1. In a process for storing and releasing heat wherein heat is absorbed by a solid hydrated salt stored in a bulk container thereby causing said solid salt to become molten, and thereafter said molten salt is allowed to solidify and heat released from said salt in the solidification step is recovered, the improvement which comprises terminating the input of said heat into said solid salt prior to the complete conversion of said solid salt to the molten state to prevent formation of an undesired lower energy solid hydrated salt and thereby to maintain heat storage capacity of said salt substantially unchanged, and internally circulating said mixture of said molten salt and said solid salt within said container during the solidification step thereby preventing stratification and supercooling.

2. The process as described in claim 1 wherein the hydrated salt is sodium thiosulfate pentahydrate.

3. The process as described in claim 1 wherein the hydrated salt is sodium acetate trihydrate.

4. In a process for storing and releasing heat wherein heat absorbed by solid sodium thiosulfate pentahydrate stored in a bulk container thereby causing said sodium thiosulfate pentahydrate to become molten and form an aqueous solution of sodium thiosulfate, and thereafter said sodium thiosulfate is allowed to solifiy as sodium thiosulfate pentahydrate and heat is recovered therefrom, the improvement which comprises terminating the input of heat into said solid sodium thiosulfate pentahydrate prior to the complete conversion of said solid pentahydrate to the molten state to prevent formation of an undesired lower energy solid hydrated salt and thereby to maintain the heat storage capacity of said thiosulfate salt substantially unchanged, and interally circulating said mixture of said solution of sodium and said solid pentahydrate within the container during the solidification step thereby preventing stratification and supercooling.

5. A process as described in claim 4 wherein the concentration of the sodium thiosulfate within the bulk container is 55 to 61% by weight.

6. A system for storing heat through the use of the heat of fusion of a hydrated salt comprising:
  (a) a closed container for said salt;
  (b) heat exchange means within said container adapted to supply heat to and remove heat from the contents of the container;
  (c) means to terminate the supply of heat to the contents of said container in response to the temperature of said contents to prevent formation of an undesired lower energy solid hydrated salt and thereby to maintain the heat storage capacity of said contents; and
  (d) means within said container to circulate the contents thereof to prevent stratification and supercooling.

7. A system as described in claim 6 wherein said means to circulate comprises pumping means adapted to circulate the contents downward through the container.

* * * * *